United States Patent [19]
Lawson

[11] Patent Number: 5,811,950
[45] Date of Patent: Sep. 22, 1998

[54] INTERMITTENT WINDSHIELD WIPER WITH WIPE AFTER WASH

[75] Inventor: John C. Lawson, Burrus, Mich.

[73] Assignee: Chrysler Corporation, Auburn Hills, Mich.

[21] Appl. No.: 236,314

[22] Filed: May 2, 1994

[51] Int. Cl.$^6$ ..................................................... H02P 1/04
[52] U.S. Cl. .................. 318/484; 15/250.13; 15/250.17; 318/444
[58] Field of Search ............................ 318/443, DIG. 2, 318/444, 484, 483; 15/250.13, 250.12, 250.17, 250.16

[56] References Cited

U.S. PATENT DOCUMENTS

| | | | |
|---|---|---|---|
| 4,091,317 | 5/1978 | Roszyk et al. | 318/DIG. 2 |
| 4,158,159 | 6/1979 | Orris et al. | 318/443 |
| 4,339,698 | 7/1982 | Kearns | 318/444 |
| 4,544,870 | 10/1985 | Kearns et al. | 318/444 |
| 4,547,716 | 10/1985 | Johnson et al. | 318/443 |
| 4,728,870 | 3/1988 | Hirano et al. | 318/443 |
| 4,731,566 | 3/1988 | Takarshi | 318/444 |
| 4,916,373 | 4/1990 | Al-Attar et al. | 318/DIG. 2 |
| 4,947,092 | 8/1990 | Nabba et al. | 318/444 |
| 5,241,248 | 8/1993 | Furukoshi | 318/443 |

OTHER PUBLICATIONS

Helmut G Seidler, "Electronic wiper timing devices," Society of Automotive Engineers, Automotive Engineering Congress, Jan. 15, 1971, pp. 1–8.

*Primary Examiner*—John W. Cabeca

[57] ABSTRACT

An intermittent windshield wiper system achieves a substantial wipe event at the end of a wash cycle during intermittent operation. The innovative wiper system includes gear reducing box for reducing the oscillation rate of the wipers below the rotation rate of the wiper motor; a selector switch that functions in conjunction with a first rely for controlling the supply of power to the wiper motor to operate it at a higher speed during the initial phase of intermittent operation and during the wash cycle and with a second relay for controlling the supply of power to the wiper motor to operate it at a lower speed during the remainder of the intermittent cycle and to brake the wiper motor during the final phase of intermittent cycle. The innovative wiper system advantageously utilizes the same mechanism to achieve the normal intermittent dwell, instant on, and wipe after wash timing.

6 Claims, 3 Drawing Sheets

INTERMITTENT WINDSHIELD WIPER WITH WIPE AFTER WASH

FIELD OF THE INVENTION

This invention relates to a intermittent windshield wiper system that wipes continuously when the driver actuates the wash switch and, if actuated during intermittent operation, executes at least one substantial wipe cycle to clear the windshield of the accumulated wash fluid after the driver releases the wash switch (the "wipe after wash" event).

BACKGROUND

Heretofore, wipe after wash during intermittent wiper operation was achieved by charging a capacitor at the same time that the wiper system was placed into continuous run for the wash operation. Upon release of the wash switch, the charged capacitor was used to maintain the wiper arms in continuous motion until its charge decayed. Normal intermittent operation would resume after the capacitor discharged past a predetermined threshold level. A large enough time constant would be chosen for the capacitor discharge to provide sufficient time for the requisite wipe after wash to occur. In some arrangements, relatively complex circuitry was employed to use the same capacitor for both the wipe after wash event and for timing the normal intermittent dwell period. However, no known prior system advantageously applies the relatively substantial momentum gained by the wiper arms as they run continuously during the wash operation and the characteristics of a part-time intermittent wipe system controller to achieve a substantial wipe event after release of the wash switch.

SUMMARY OF THE INVENTION

The present invention achieves a fill wipe event after the driver releases the wash switch through the advantageous utilization of the relatively substantial momentum gained by the continuously moving wiper arms during the wash cycle in combination with the timing control mechanism that is also used to control the normal intermittent dwell period. The wipers are driven by a wiper motor which runs continuously when the wash switch is actuated by the driver. In normal intermittent wiper operation, the wiper motor is energized at the beginning of a wipe cycle for a period determined by the time required for a cam follower to take a park switch out of park in response to the rotation of the wiper motor. Control of the wiper motor for the balance of the intermittent wipe cycle is thereafter controlled by the position of the park switch, which toggles from park to run and back to park at which time the normal intermittent dwell period begins.

In accordance with the present invention, the first full dwell period after the driver releases the washer switch occurs only after the wiper has executed a wipe after wash event which is sufficient to clear the accumulated wash fluid from the windshield, even if the driver releases the washer switch at an unfavorable point in the continuous wiping cycle.

The time delay provided for the relay that controls power supplied to the wiper motor to switch to its "off" or deenergized condition after release of washer switch in combination with the substantial momentum gained by the mechanical wiper arm and blade subsystem (the "wipers") relative to that of the wipe motor achieves the desired substantial wipe after wash event before the occurrence of the next full intermittent dwell period.

In accordance with a more specific and particularly advantageous application of the present invention, the intermittent system is of the type wherein activation of a wash switch forward biases a discharging transistor such that a timing capacitor is discharged through that discharging transistor to ground.

By advantageously utilizing this discharged timing capacitor in combination with the inertia stored in the moving wipers when the wash button is released to achieve a full wipe at the end of a wash, the present system eliminates the need for an additional capacitor, timer, or other apparatus to provide timing for the "wipe after wash" event.

Further, in accordance with the present invention, the interconnection between the wash system and the intermittent wipe system is limited to relatively simple and inexpensive circuitry that merely places the wiper system in continuous operation while the wash system is activated.

In accordance with a still more specific application of the present invention, the system includes a three-brush, two-speed motor which is made to run by supplying power to its high speed brush when the wash switch is actuated during intermittent wipe operation and during the initiation of the intermittent wipe operation itself. In an alternative form of the invention, the wiper motor is made to run during initialization of intermittent operation by supplying power to its low speed brush. Providing a relatively longer relay-on time compensates for the lower inertia in this alternative embodiment resulting from the use of the low speed brush to achieve the requisite wipe after wash event.

DETAILED DESCRIPTION OF THE PREFERRED EMBODIMENT

Figure 1:
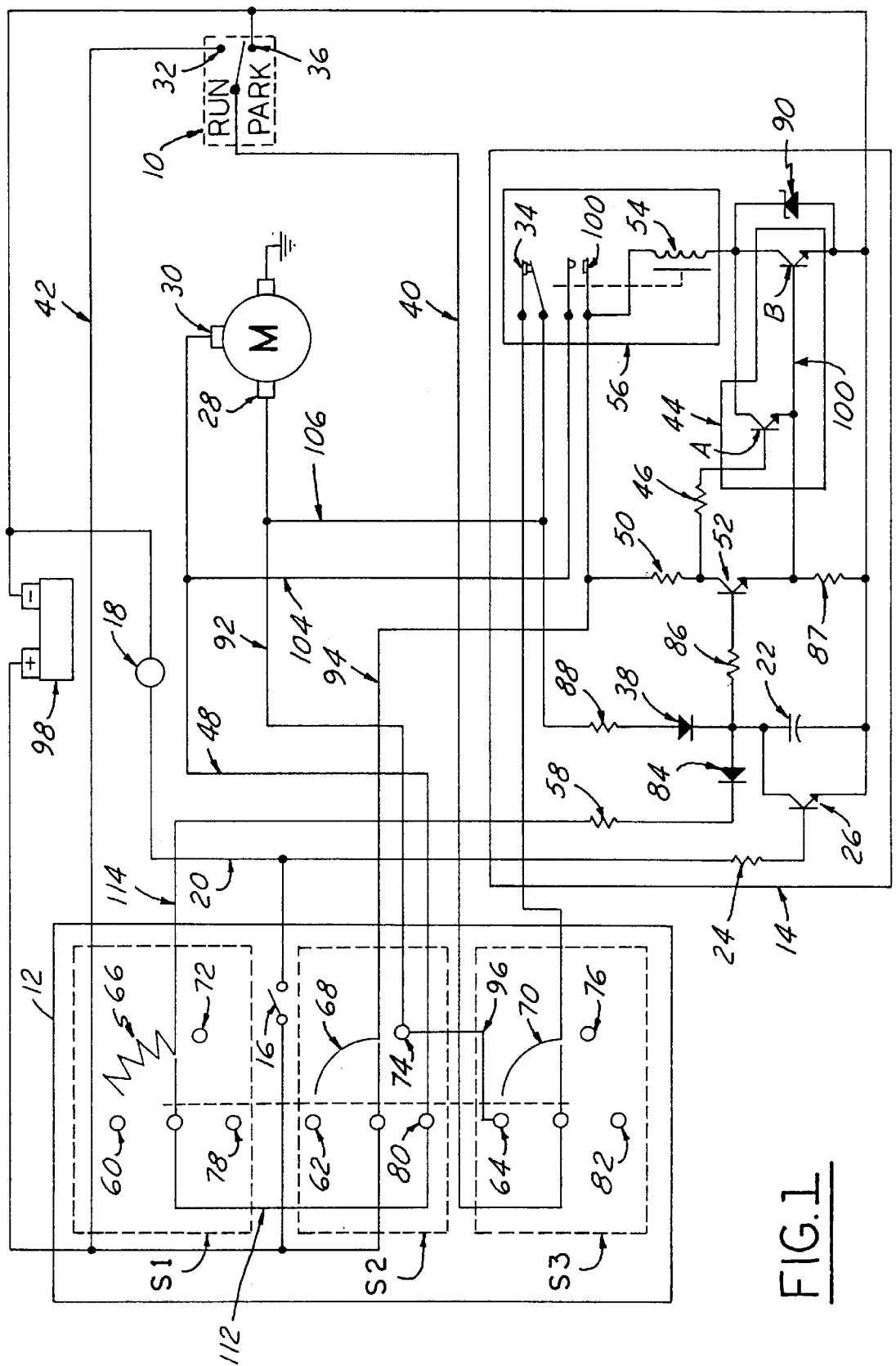
FIG. 1 is a circuit diagram depicting an intermittent wiper system with wipe after wash functionality in which both the intermittent wipe operation and the wipe after wash event are started on the high speed brush of a three-brush motor.

In the drawings, the letter M designates the windshield wiper motor. In accordance with conventional practice, the windshield wiper motor M includes a speed reducing gear box 6 that drives a linkage through a crank mechanism 7 to oscillate the windshield wiper arm and blade subassembly (the "windshield wipers" or "the wipers") 8. A characteristic of any wiper system having a wiper motor rotating at a speed more rapid than the corresponding wipe rate of the windshield wipers is the relatively large momentum of the moving wipers. As described in further detail below, this relatively large momentum present in the moving wipers is advantageously utilized in the present invention to achieve the wipe after wash event.

Figure 2:
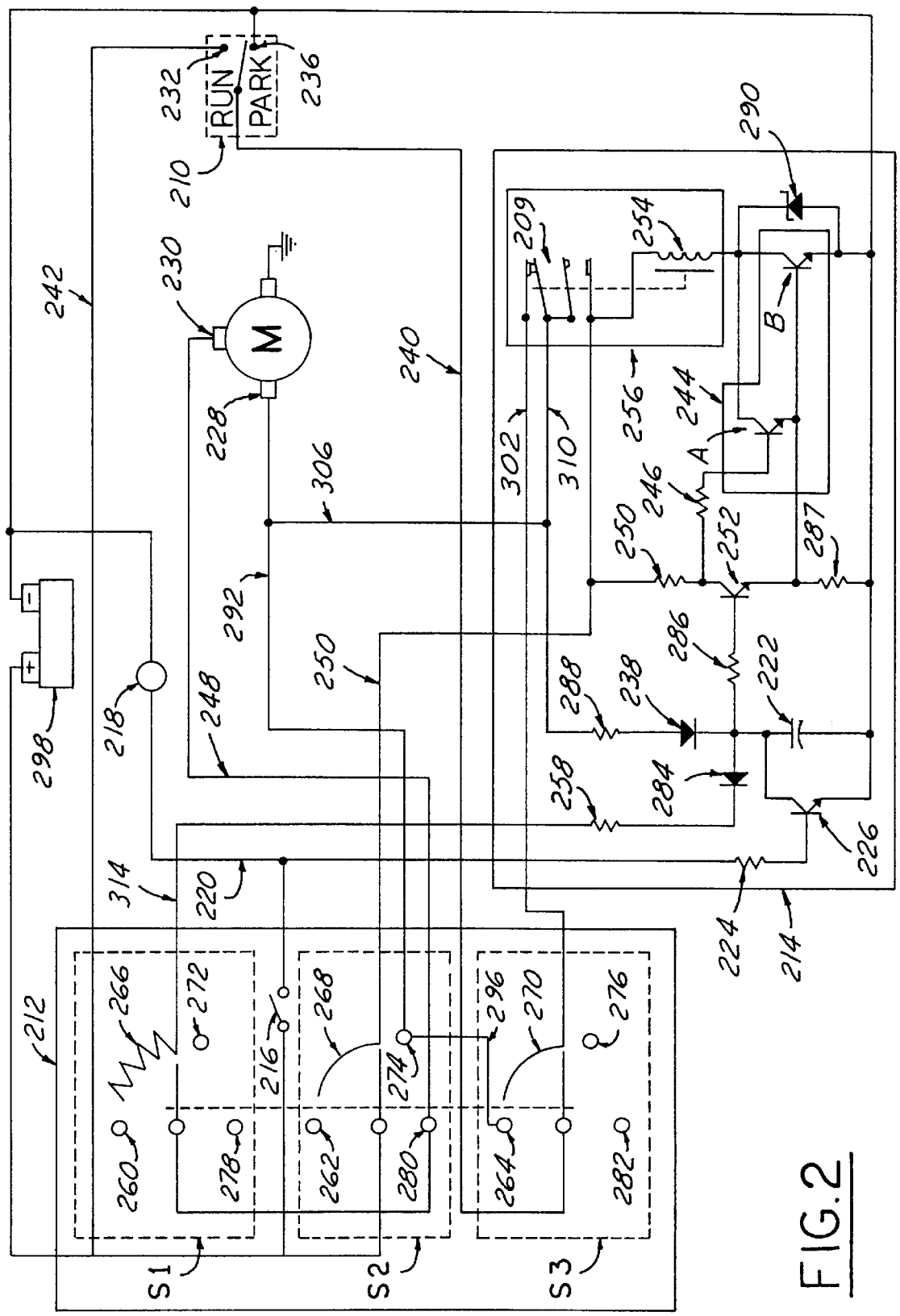
FIG. 2 is a circuit diagram depicting an intermittent wiper system with wipe after wash functionality in which both the intermittent operation and the wipe after wash event are powered through the low speed brush of a three-brush motor.

In a preferred form of the present invention, the windshield wiper motor M is a three-brush permanent magnet motor, as depicted in FIGS. 1 and 2. The common brush is grounded. The wiper motor M runs on either high speed or low speed depending upon whether power from the battery 98 is supplied to the wiper motor M through either its high speed brush 30 or its low speed brush 28, respectively.

In the circuit arrangement of FIG. 1, the intermittent windshield wiper system 5 also comprises a park switch 10 whose function is responsive to a selector switch 12 and to an intermittent controller 14.

In the preferred embodiment, the park switch 10 is a single-pole, double-throw switch. In accordance with conventional practice, the park switch 10 is actuated by a cam follower 11 that moves in response to the rotation of the output shaft of a gear reducing box 6 which has a cam 9 of such location and circumferential extent so as to move the cam follower 11 to contact and actuate the park switch 10 at a time when the wipers 8 are out of the driver's line of vision, a position conventionally called "park." The wipers 8 assume the park position whenever the wiper system 5 is not wiping. Although the park switch 10 is illustrated as a single-pole, double-throw switch, a multi-pole switch, or some other variety of switch, could be used to provide additional functionality or to lessen cost.

The selector switch 12, manually actuated by the vehicle driver, is typically placed adjacent to the driver's other manual controls in the vehicle. In the preferred embodiment, the selector switch 12 is a three-pole, four-position rotary switch having three selector switch contact banks, S1, S2, and S3, located on a common shaft. However, any three-pole, four-position switch having three switching banks could be used for the same purpose. The three banks S1, S2, and S3 of the selector switch 12 are actuated in unison, as indicated in FIGS. 1 and 2, when the driver rotates the operating knob on the common shaft of the selector switch 12.

As the driver rotates the common shaft, the contactor on each bank S1, S2, and S3 of the selector switch 12 breaks contact with its corresponding park contact 60, 62, and 64 and is rotated through the respective intermittent wipe regions 66, 68 and 70 to make contact first with the corresponding low speed contact 72, 74, and 76, and then with the corresponding high speed contact 78, 80, and 82, respectively. This rotation of selector switch 12 removes the windshield wipers 8 from their parked position and places them first into intermittent operation, then into low speed continuous operation, and finally, into high speed continuous operation. Timing variation in intermittent operation is provided in the preferred embodiment by gradually decreasing the intermittent dwell period T from a maximum to a minimum value as the driver rotates the selector switch 12 from park toward the low speed continuous setting in the intermittent wipe region.

In the preferred embodiment, the selector switch 12 also includes the driver-actuatable washer switch 16, as shown in FIG. 1. The washer switch 16, spring biased to an open position, is closed by hand actuation to supply power from the battery 98 to a washer motor 18. In accordance with conventional practice, the washer motor 18 drives a pump that squirts cleaning fluid onto the windshield. The specific washer motor 18 and pump construction can be any one of the various devices known for this purpose in the art. Although located within the selector switch 12 in the preferred embodiment, the washer switch 16 could also be located apart or remote from the selector switch 12.

The wiper system 5 further includes an intermittent controller 14 which controls the supply of power from the battery 98 to the wiper motor M to start intermittent wipe operation and the duration of the intermittent dwell period T as described below. Within the intermittent controller 14, a control resistor 50 is connected to the collector of a control transistor 52 and to a second base resistor 46 of a transistor trigger combination 44 comprised of first and second transistors A and B, respectively. The emitter of the control transistor 52 is connected to a relay control resistor 87 which is terminated to ground. The emitter of the first transistor A in the trigger combination 44 is connected to the base of the second transistor B of the trigger combination 44 and to the emitter of the control transistor 52. The collectors of the first and second transistors A and B in the trigger combination 44 are connected to the coil 54 of a relay 56 which is generally indicated by the numeral 56. The emitter of the second transistor B in the trigger combination 44 is connected to ground. A zener diode 90 is connected across the collector—emitter of the second transistor B in the trigger combination 44.

Power is applied to the control transistor 52 within the intermittent controller 14 through the S2 i/w contact 68 via the conductor 94. Power is also distributed from the conductor 94 to the coil 54 of the relay 56 through the control resistor 50.

The S1 i/w resistance 66, which determines the intermittent dwell period T, is connected to a timing capacitor 22 within the intermittent controller 14 through a minimum dwell resistor 58. The timing capacitor 22 is also connected to the low speed brush 28 of the wiper motor M through a charge limit resistor 88 and a second blocking diode 38. A discharging transistor 26 whose collector and emitter are connected across the timing capacitor 26 is connected to the washer motor 18. The washer switch 16, when actuated, completes a circuit path to the washer motor 18 from the battery 98 turning on the washer motor 18. At the same time, voltage is applied via conductor 20 to forward bias the discharging transistor 26. Turning on discharging transistor 26 discharges the timing capacitor 22 and prevents its recharging when the washer switch 16 is actuated. Under all other operating conditions the discharging transistor 26 is not forward biased and therefore does not affect the charging of the timing capacitor 22. The S1 i/w resistor 66 is also is connected to the control transistor 52 within the intermittent controller 14 through a minimum dwell resistor 58, a first blocking diode 84, and a first base resistor 86.

The S2 i/w contact 68 of the selector switch 12 is connected to the of the normally-open relay contact 100 within the intermittent control 14 via the conductor 94 while the movable arm of the normally-open relay contact 100 is connected to the high speed brush 30 of the wiper motor M via the conductor 104. The movable arm of the normally-closed relay contact 34 within the intermittent controller 14 is connected to the stationary arm timing capacitor 22 through the charge limit resistor 88 and the second blocking diode 38 via the conductor 110 as well as to the low speed brush 28 of the wiper motor M. Finally, the normally-closed relay contact 34 is connected to the movable arm of the park switch 10 through the S3 i/w contact 70 via the conductor 40.

Figure 3:
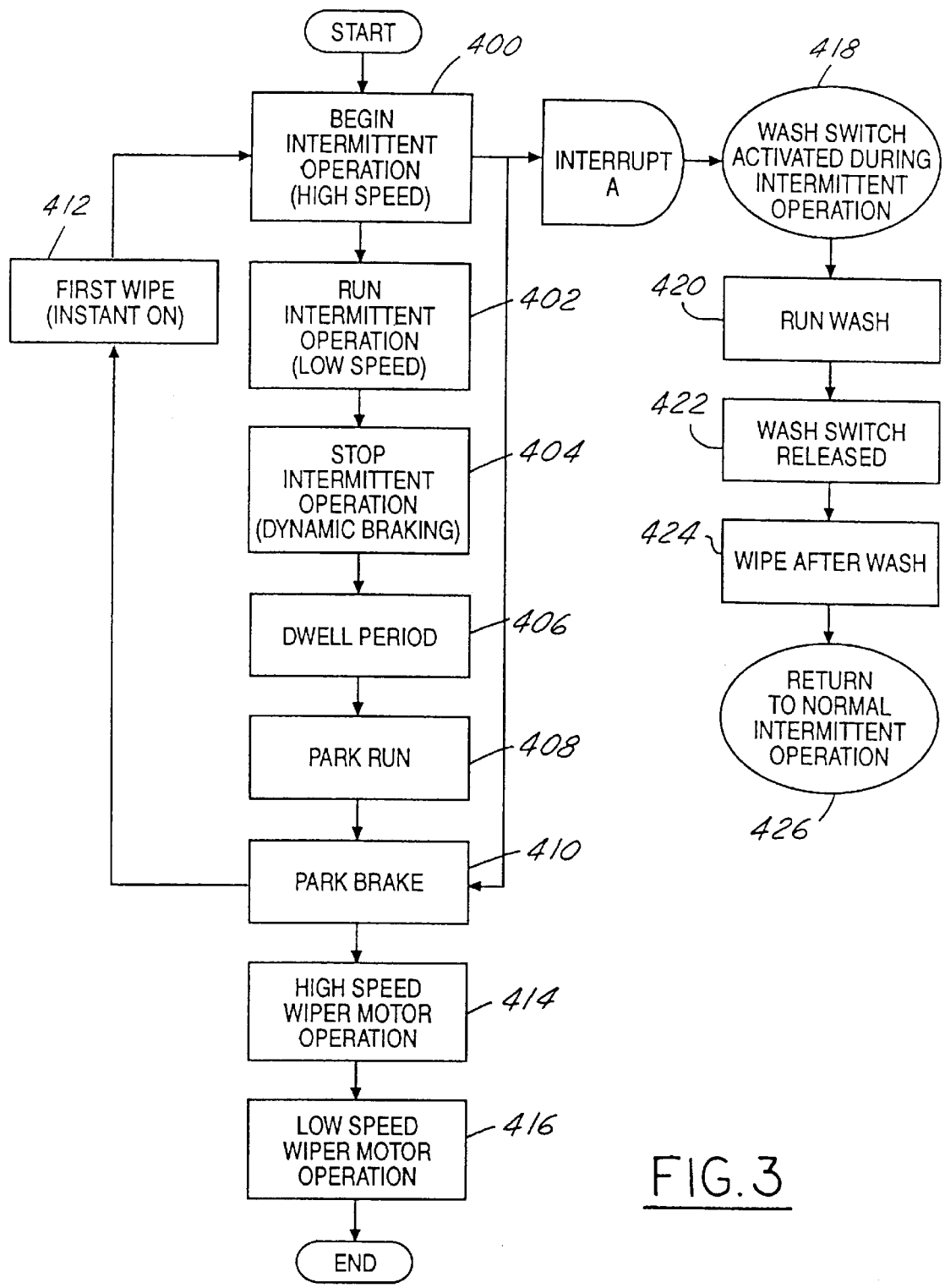
FIG. 3 is a flowchart depicting the operation of the intermittent wiper system of FIG. 1.

Referring now to the circuit depicted in FIG. 1 and the flowchart depicted in FIG. 3, the driver rotates the selector switch 12 out of its park setting into the intermittent region in step 400 to initiate intermittent operation. A conducting path from the battery 98 to pickup the coil 54 is completed via the S2 i/w contact 68 of the selector switch 12 and the conductor 94 to close the normally-open contact 100 in the relay 56. Since the timing capacitor 22 is not fully charged at this time, the control transistor 52 within the intermittent controller 14 is non-conducting and therefore the equivalent of an open circuit. Thus, current flowing through the conductor 94 is applied via the control resistor 50 and the third base resistor 46 to the base of the first transistor A in the trigger combination 44 causing the first transistor A to turn on. The second transistor B in the trigger combination 44 thereupon switches on energizing the coil 54 in the relay 56 which causes the normally-open contact 100 to close. Closing the normally-open contact 100 completes a circuit path from the positive terminal of the battery 98 to the high speed brush 30 of wiper motor M via the conductor 104 causing the wiper motor M to run at high speed and the wipers 8 to function in high speed continuous operation. Thus, closing the normally-open contact 100 within the intermittent controller 14 supplies power to run the wiper motor M during the initial phase of intermittent operation.

Each intermittent wipe starts from a dwell condition, wherein the wiper motor M and the wiper system 5 including the wipers 8, are at a standstill in the park position and the timing capacitor 22 is uncharged. The instant that the wiper motor M starts to run on high, the timing capacitor 22 begins to charge during a charging period P. At the beginning of this charging period P, the movable arm of the park switch 10 is in contact with the park contact 36. By the end of the charging period P, the cam follower 11 must make contact with the movable arm of the park switch 10 to toggle the movable arm to the run contact 32. The time required for the wiper motor M to accelerate from a standstill to the point at which the cam follower actuates the park switch 10 into its run position defines the length of the charging period P and therefore the time constant of the charging timing capacitor 22. Thus, the time constant of charging capacitor 22 can be determined by calculating the number of degrees that the output shaft of the gear reducing box 6 must turn before the cam follower 11 actuates the movable arm of the park switch 10 in response to the accelerating condition of the wiper motor M.

Once the wiper motor M is operating at high speed, a voltage is generated at the low speed brush 28 of wiper motor M which charges the timing capacitor 22 through the charge limit resistor 88 and the second blocking diode 38. Upon charging the timing capacitor 22 to a predetermined threshold voltage, 1.5 volts in the preferred embodiment, the control transistor 52 switches on. When the control transistor 52 begin to conduct, the resistance across its collector—emitter becomes negligible establishing a current path from the conductor 94 and the junction of the control resistor 50 through the control transistor 52 and the relay control resistor 87. The value of the relay control resistor 87 is chosen to be sufficiently small such that the voltage appearing at the junction of relay control transistor 87 and the control transistor 52 and along the conductor 108 is sufficiently low to ensure that the second transistor B in the trigger combination 44 is pulled down to its non-conducting state. Pulling the second transistor B down to its non-conducting state deenergizes the coil 54 which opens the normally-open relay contact 100 and closes the normally-closed relay contact 34 thereby completing a circuit path to the low speed brush 28 of the wiper motor M to cause the wiper motor M and the wipers 8 to run at low speed during the rest of normal intermittent operation. Once the wiper motor M rotates a sufficient number of degrees such that the cam follower 11 toggles the park switch 10 to its run position, the operation of the wiper motor M is controlled thereafter by the position of the movable arm of the park switch 10.

During intermittent operation in step 402, the movable arm of the park switch 10 is toggled by the cam follower 11 into its run position, as described above, to complete a circuit path from the positive terminal of battery 98 to the low speed brush 28 of the wiper motor M through the S3 i/w contact 70 of the selector switch 12 and the normally closed relay contact 34 via the conductors 40, 42, 102 and 106. The wiper motor M thereupon operates the wipers 8 intermittently while running on the low speed brush of wiper motor M. Thus, the position of the park switch 10 controls the supply of power to run the wiper motor M during the remainder of intermittent operation.

When the wipers 8 physically return to their parked position in step 404, the cam follower 11, in response to the rotation of the wiper motor M, toggles the movable arm of the park switch 10 to its parked position in which its makes physical contact with the park terminal 36. A dynamic braking path is thus completed from the negative terminal the battery 98 to the low speed brush 28 of wiper motor M through the park switch 10, the S3 i/w contact 70, and the normally closed relay contact 34 via the conductors 32, 40, 102 and 106. The wiper motor M thereupon brakes to a stop before the cam follower 11 can return the movable arm of the park switch 10 to its run position.

By the time the intermittent wipe is complete and the park switch 10 has returned to its park position, the capacitor 22 has charged to a predetermined voltage more than sufficient to turn on the control transistor 52. As described above, the relay 32 by this time has been deenergized such that the wiper motor M is in its standstill condition. Because the wiper motor M is not rotating, the low speed brush 28 is at substantially the same voltage as the negative terminal of the battery 98. The second blocking diode 38, connected to the low speed brush 28 of the wiper motor M through charge limit resistor 88 and conductor 106, is thus held in a nonconducting state preventing the timing capacitor 22 from discharging through the low speed brush 28 of the wiper motor M. However at this time in step 406, timing capacitor 22 can and does discharge through the high speed brush 30 of the wiper motor M via the first blocking diode 84, the variable S1 i/w resistor 66, the S2 high speed contact 80 and the conductors 48, 112 and 114.

Variable Si i/w resistor resistance 66, arcuate in shape, coacts with the movable of arm of the Si bank of the selector switch 12 to provide a driver-selectable variable resistance in the above described discharge path for the timing capacitor 22 thereby allowing the driver to control the time constant of the intermittent dwell period T. At the time thus fixed by the setting of the selector switch 12, the timing capacitor 22 discharges to a voltage level below the threshold required to maintain the control transistor 52 in a conducting state. The control transistor 52 therefore turns off, diverting current from the conductor 94 through the control resistor 50 and the second base resistor 46 to the base of the first transistor A in the trigger combination 44. As a result, both transistors A and B in the trigger combination 44 turn on commencing a new intermittent wipe cycle.

In the foregoing description, the wiper system 5 has been described as completing a full wipe event after the wash switch 16 is released during intermittent operation, i.e., a substantially full stroke in one direction of wipe followed by another substantially full stroke in the opposite direction.

In accordance with the present invention, the discharging transistor 26 is forward-biased to its conducting state as a result of the vehicle driver actuating the washer switch 16 to energize the washer motor 18 in step 418. Before the driver actuates washer switch 16, the timing capacitor 22 is maintained in an unchanged state below the predetermined threshold voltage which pulls down the control transistor 52 to its non-conducting state. While the control transistor 52 is held in this non-conducting state, the first and second transistors A and B of the trigger combination 44 conduct causing the coil 54 of the relay 56 to pickup and close the normally-open relay contact 100 thereby supplying power to the high speed brush 30 of the wiper motor M. Wiping during the wash operation in step 420 therefore, is driven by a wiper motor M that is powered through its high speed brush 30.

When the driver subsequently releases the washer switch 16 in step 422, the application of cleaning fluid to the windshield terminates. Immediately thereafter in step 424, the timing capacitor 22 is charged from the low speed brush 28 of the wiper motor M through the charge limit resistor 88 and the second blocking diode 38 via the conductor 106. The timing capacitor 22 is charged at substantially the same time constant that it is charged during the initiation of intermittent wipe operation. However, since the wiper motor M is powered through the high speed brush 30, and is therefore already running on high speed, the normally-open contact 100 of the relay 56 stays closed for a substantial charging period P after the movable arm of the park switch 10 has been toggled to its park position while the timing capacitor 22 charges to the predetermined threshold voltage. This charging period P is sufficient, in conjunction with the momentum of the already-running wiper motor M and the wipers 8, to ensure that a substantial wipe after wash event takes place after the driver releases the wash switch 16 but before the park switch 10 reassumes control of the wiper system 5 in step 426.

In step 408, the driver rotates the selector switch 12 to its park position. However, the wiper motor M continues to run on low speed since the movable arm of the park switch 10 continues to be connected to the run contact 32 thus providing a circuit path from the positive terminal of the battery 98 to the low speed brush 28 of the wiper motor M through the movable arm of the park switch 10 and the S3 park contact 64 of selector switch 12 via the conductors 42, 40, 96 and 92.

When the wiper arm and blade subassembly 8 returns to its physically parked position in step 410, the wiper system 5 is again dynamically braked as described above in step 404.

As the vehicle driver rotates the selector switch 12 into the intermittent region 66, 68 and 70 in step 412, the coil 54 of the relay 56 is immediately energized causing the normally-open relay contact 100 to close thus completing a circuit path from the positive terminal of the battery 98 to the high speed brush 30 of the wiper motor M. First and second transistors A and B conduct as a result of the positive voltage from the battery 98 which is applied to the base of the first transistor A in the trigger combination 44 through the S2 low speed contact 74 of the selector switch 12, the control resistor 50, and the second base resistor 46 via the conductor 94. The control transistor 52 remains non-conducting at this point because the timing capacitor 22 is uncharged and therefore supplies no current to the base of the control transistor 52.

In summary, as the driver rotates the selector switch 12 out of its park setting into the intermittent region as described above, the timing capacitor 22 is uncharged and the control transistor 52 is, therefore, non-conducting. When the coil 54 of the relay 56 is energized to close the normally-open relay contact 100, power is supplied to the high speed brush 30 of the wiper motor M. Positive voltage then appears at the low speed brush 28 since the wiper motor M is running. Thereafter, the timing capacitor 22 begins to charge from the low speed brush 28 of the wiper motor M through the charge limit resistor 88 and the second blocking diode 38 via the conductor 106.

The time constant for charging the timing capacitor 22 and the value of the positive voltage appearing at the low speed brush 28 of wiper motor M are related at this time in that the timing capacitor 22 does not charge to a level sufficient to forward bias the control transistor 52 until the movable arm of the park switch 10 has been toggled to its run position 32. Thus, the control of the wiper system 5 during intermittent operation is time-responsive part-time action wherein the coil 54 of the relay 56 energizes the wiper motor M through the high speed brush for the wipe after wash event and for the start of intermittent wipe only with the park switch 10 controlling the completion of the intermittent wipe cycle. The change from the relay-on to the relay-off condition takes place in timed relation to the instant that the wiper motor M begins to run.

In step 414, the driver rotates selector switch 12 to its high speed continuous setting. A conducting path is completed thereby from the battery 98 to the high speed brush 30 via the S2 high speed contact 80 of the selector switch 12 and the conductor 48 to energize the wiper motor M.

When the park switch 10 is actuated while the wiper motor M is running in high speed continuous operation, no brake path is placed across the wiper motor M since the movable arm of the park switch 10 is isolated from the rest of the wiper system 5 at the S3 bank of the selector switch 12.

In step 416, the driver rotates the selector switch 12 to its low speed continuous setting. A conducting path is completed thereby from the battery 98 to the low speed brush 28 of the wiper motor M via the S1 low speed contact 74 of the selector switch 12 and the conductor 92 to energize the wiper motor M.

When the park switch 10 is actuated while the wiper motor M in running in low speed continuous operation, no brake path is placed across the wiper motor M since the movable arm of the park switch 10 is isolated from the rest of the wiper system 5 at the S3 bank of the selector switch 12.

FIG. 2 is a circuit diagram similar to FIG. 1 but depicting a wiper system 5 that provides intermittent operation utilizing a wiper motor which is supplied power solely through its low speed brush. Since much of the circuit depicted in FIG. 2 is like that of FIG. 1, like components in FIG. 2 are indicated by like numbers increased by 200. The above description for the operation of the circuit of FIG. 1 may be applied to the operation the circuit of FIG. 2 unless otherwise indicated.

The circuit of FIG. 2 differs from that of FIG. 1 in that the normally-closed relay contact 230 and the normally-open relay contact 300 have been connected such that they function together as a single-pole, double-throw relay switch 209. In addition, the conductor 104 depicted in FIG. 1 running from the high speed brush 30 of the wiper motor M to the stationary arm of the normally-open relay contact 100 has been eliminated in FIG. 2. As in FIG. 1 and according to the flowchart of FIG. 3, when the driver rotates the selector switch 212 in FIG. 2 into the intermittent setting ins step 400, the timing capacitor 222 is uncharged which holds the control transistor 252 in its nonconducting state. The first and second transistors A and B in the trigger combination 244 conduct current through the S2 i/w intermittent contact 268, the control resistor 250, and the second base resistor 246 via the conductor 294 to energize the coil 254 of the relay 256. However in the circuit of FIG. 2, energizing the coil 254 in step 402 toggles the relay switch 209 to complete a circuit path that supplies power to the low speed brush 128 of wiper motor M. This circuit path extends from the positive terminal of the battery 298 to the low speed brush 228 of the wiper motor M through the S2 i/w contact 268 via the conductors 294 and 406. Immediately thereafter, the timing capacitor 222 charges from the low speed brush 228 through the charge limit resistor 288 and the second blocking diode 238 via the conductor 306. The park switch 210 toggles to its run position in the manner described above. When the timing capacitor 222 reaches its predetermined threshold voltage, the control transistor 252 turns on, the first and second transistors A and B in the trigger combination 244 are pulled down to their non-conducting states and the coil 254 is deenergized. In response, the normally-open contact 300 opens and the normally-closed contact 234 closes connecting the movable arm of the park switch 10 to the low speed brush 228 such that the wiper motor M continuous to run at low speed. This circuit path is completed through the S3 i/w contact 270 via conductors 240, 201, 310, 306, 292 and 242. Because the wiper motor M is powered through the low speed brush 228 throughout the intermittent cycle it is immaterial at what point the coil 254 of FIG. 2 is deenergized during the intermittent wipe cycle so long as it is deenergized by the time the park switch 210 is toggled back to its park position at the end of the wipe cycle so that dynamic braking of the wiper motor M can occur at this time.

According to the present invention, when the driver releases the wash switch 216 in step 422, a substantially complete wipe after wash event takes place in step 424 before the normal intermittent dwell period T ensues. Even if when the wipers 8 are already running when the wash switch 216 is released, the timing capacitor 222 must be either in an uncharged state or at least below the predetermined voltage threshold to ensure that the coil 254 will remain energized for a time sufficient both to complete the wipe after was event and to enable the running wiper system 5 to toggle the park switch 210 from its run position to its park position and back to its run position before dynamic braking occurs wherein the relay coil 254 must be deenergized. The time constant of the timing capacitor 222 must be sufficiently long to ensure that the above mentioned events occur even if the wash switch 216 is released at the least favorable point during last continuous wipe of the wash operation. Because the wipers 208 in circuit of FIG. 2 are driven by a wiper motor M powered from its low speed brush 228, the wipers 208 have less momentum during the wipe after wash event than do the wipers 8 in the circuit of FIG. 1 which are initially driven by a wiper motor M powered from its high speed brush 230. This "lost momentum" necessitates an increased time constant for discharging the timing capacitor 222 to ensure that a substantially complete wipe after wash event occurs during which discharging, the relay coil 54 must be energized. The greater time constant for the timing capacitor 222 in FIG. 2 ensures that the wipers operate in normal intermittent wipe even if the charging time constant of capacitor 122 is set to keep the coil 154 energized until just before the park switch 210 returns it park position. By setting a relatively long time constant for the charging of the timing capacitor 222 within the above described limitation, the wiper system 5 of FIG. 2 will finish executing the desired wipe after wash event in step 424 after the release of the wash switch 216 before the wiper motor M is dynamically braked to initiate the next normal intermittent dwell period T. The duration of the intermittent dwell period T is set by the RC time constant for discharging the timing capacitor 222.

It may be apparent to one skilled in the art that the switching transistor 26 or 226, could be eliminated if a washer motor 18 or 218 is connected directly to the negative terminal of the battery 98 or 298. In such instance, closure of the washer switch 16 or 216 would discharge the timing capacitor 22 or 222 by connecting both sides of the timing capacitor 22 or 222 to ground.

Other modifications and alternative constructions will, of course, be apparent to those skilled in the art who should realize that such variations made to the disclosed embodiments may still properly fall within the scope of the present invention as defined by the claims which follow.

What I claim is:

1. An intermittent windshield wiper system having at least three phases of intermittent operation and at least one windshield wiper driven by a two-speed wiper motor with at least one high speed brush and at least one low speed brush and a wash switch to interrupt intermittent operation when actuated, comprising:

reducing means, connected to said wiper motor, for reducing the oscillation rate of said wipers below the rotation rate of said wiper motor;

control means, in communication with said high speed brush of said wiper motor, for controlling the supply of power to run said wiper motor at its higher speed during the first one of said three phases of intermittent operation and during the wash cycle; and park switching means, in communication with said control means and responsive to the rotation of wiper motor, for controlling the supply of power to operate said wiper motor at its lower speed during the second one of said three phases of intermittent operation and to brake said wiper motor beginning a dwell period during the third one of said three phases of intermittent operation; wherein a substantial wipe after wash event is completed after releasing the wash switch.

2. The system of claim 1, wherein said control means includes:

capacitive timing means, connected to said low speed brush of said wiper motor, said capacitive timing means responsive to the release of said wash switch for charging said capacitive timing means through said low speed brush to provide timing for the substantial wipe after wash event.

3. The system of claim 1, further comprising:

selection switching means with driver-selectable variable resistance means, connected to said capacitive timing means, said selection switching means for selectively applying power to said high speed brush to provide timing for said intermittent operation.

4. The system of claim 3, wherein said control means further includes:

relay contact means, connected to said high speed brush, for switching power to said wiper motor;

trigger switching means, responsive to said selection switching means, for actuating said relay contact means; and first control switching means, connected to said trigger switching means, for controlling the flow of current to said trigger switching means through said high speed brush of said wiper motor to supply power to said high speed brush.

5. The intermittent windshield wiper system of claim 3, wherein said capacitive timing means is further connected to said high speed brush of said wiper motor through said selection switching means furnishing a discharge path through said high speed brush and providing timing during said third one of said three phases of intermittent operation.

6. The intermittent windshield wiper system of claim 4, further comprising:

second control switching means, connected to said first control switching means and said capacitive switching means such that said second control switching means is held in a conducting state until said capacitive sensing means reaches a predetermined threshold value that de-energizes said first control switching means, for providing timing for energizing said high speed brush upon actuation of said selection switching means during said first one of said three phases of intermittent operation.

\* \* \* \* \*